Patented July 14, 1931

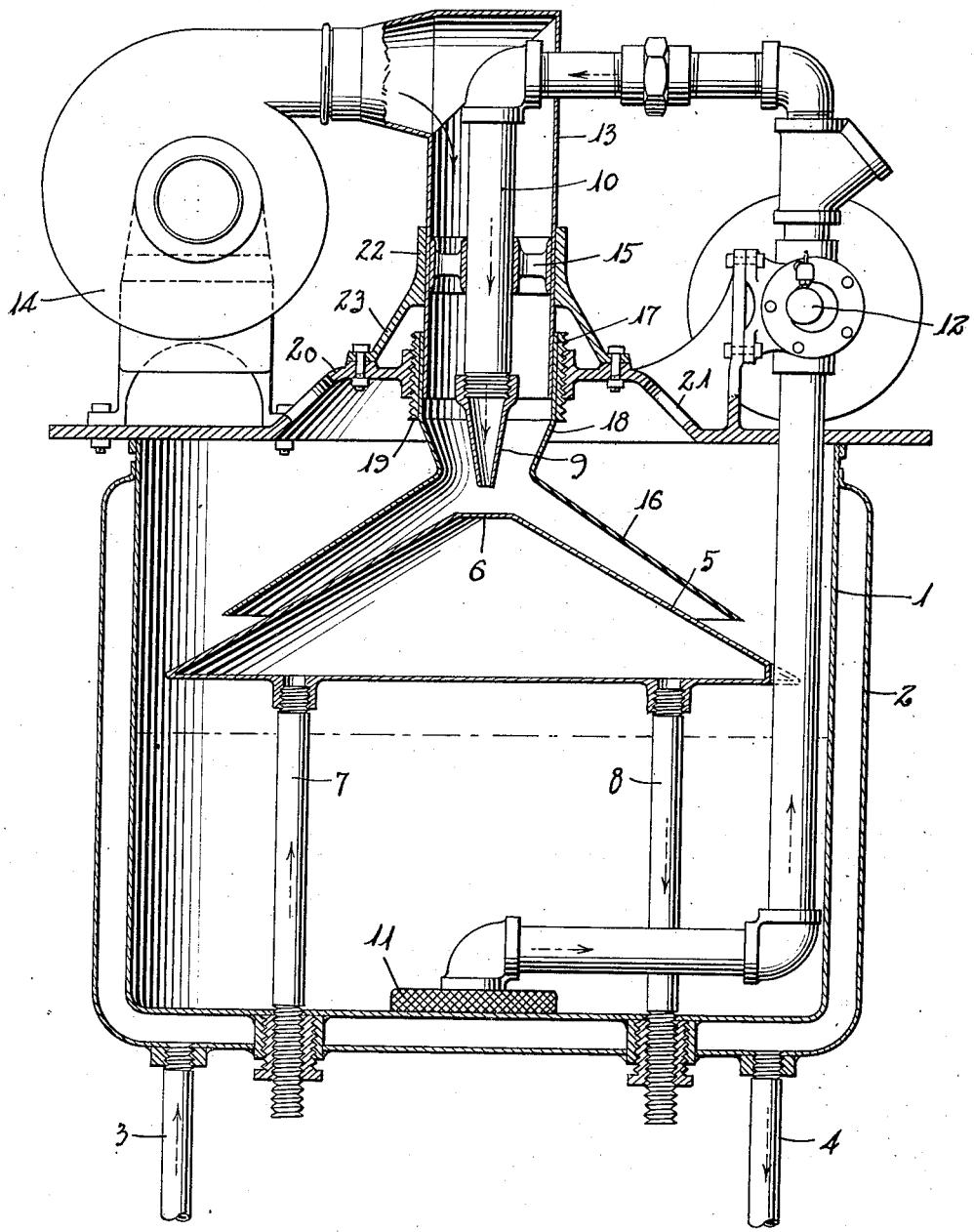

1,814,400

UNITED STATES PATENT OFFICE

SWINFEN BRAMLEY-MOORE, OF WHITE PLAINS, NEW YORK

VISCOSITY REDUCER

Application filed February 10, 1930. Serial No. 427,396.

The present invention relates to equipment for reducing the viscosity of and improving chocolate and other materials, and aims to provide a novel and improved appliance of that kind.

Another object of the invention is the provision of novel means for aerating chocolate or other material, and a further object in this connection is to provide novel means for mixing streams of air and chocolate or other material in an effective manner.

A further object is the provision of such an appliance which may also be employed for roasting the chocolate or material in an efficient manner.

The invention also has for an object the provision of an appliance of the kind indicated comprising a novel construction and assembly of the component elements.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein the appliance is shown partly in vertical section and partly in elevation.

A container 1 is employed having a jacket 2 for the circulation of steam or other fluid for heating the container, the steam or fluid being supplied through the supply pipe 3 and being discharged through the pipe 4.

Located within the container is a hollow cone 5 which preferably has the flattened apex 6, and pipes 7 and 8 passing through the bottom of the container 1 are attached to the base of the cone to support the cone and also provide for the delivery of steam or other heating fluid into and the discharge thereof from the cone. The cone being heated will roast the material flowing over the cone.

The chocolate or other material is discharged against the apex of the cone through a nozzle 9 on the discharge end of a pipe 10 which has its inlet end opening into the container at the bottom thereof, a strainer 11 being preferably provided to prevent solid or unmolten particles of chocolate entering the pipe. A high pressure pump 12 is connected in the pipe 10 for pumping the chocolate from the container and discharging it under pressure through the nozzle 9 onto the cone, so that the impact of the chocolate against the cone will break up the stream of chocolate and same will spread in all directions and flow down the cone 5.

An air delivery pipe 13 surounds the discharge terminal of the pipe 10, both of which lead downwardly toward the cone, and a blower 14 is connected with the pipe 13 for delivering air under pressure through said pipe. A spider 15 is provided between the pipes 10 and 13 for maintaining them concentric.

A conical hood or shield 16 is disposed over the cone 5 and has a neck 17 telescoping over the lower end of the pipe 13, and said neck has a downwardly tapered or contracted portion 18 surrounding the tapered nozzle 9 to direct the stream of air close to the point where the chocolate is discharged from the nozzle. The shield 16 prevents the spray of chocolate from passing too far from the cone, and also confines the stream of air close to the cone, so that the streams of chocolate and air will comingle as they pass downwardly and radially between the cone and shield.

As shown, the shield 16 has a greater inclination than the wall of the cone, to reduce the width or height of the space between the cone and shield radially, and thereby avoid too much reduction in velocity of the air as it passes radially from the apex of the cone. The angular relation of the cone and shield may be such that the air velocity will be uniform, although as shown the air velocity will decrease somewhat as the air moves toward the edge of the shield, but not as much as would occur if the walls of the shield and cone were parallel.

The shield is made adjustable in order to increase and decrease the height of the conical air passage between the cone and shield. For this purpose the neck 17 of the shield is secured within a bushing 19 which is screwthreaded through the top of the container, so that by turning the shield 16 it may be raised or lowered.

The top of the container has a raised portion 20 provided with openings 21 to permit the air and vapors to pass out, and a collar 22 embracing the pipe 13 is supported by a spider 23 from the raised portion 20.

The operation is obvious from the above, in that the pump 12 pumps the chocolate from the bottom of the container and discharges through the nozzle 9 onto the cone, the impact breaking up the stream of chocolate so that the chocolate flows in all directions down the cone. At the same time air is discharged around and over the stream of chocolate, so that the air is directed through and between the particles of chocolate. This will aerate the chocolate to improve the flavor thereof, as well as reducing the viscosity. It has been found that in passing air through chocolate the flavor is not only improved, but also that the viscosity of the chocolate is reduced. Moreover, the cone 5 being heated will roast the chocolate during the comingling action of the chocolate and air as they flow downwardly over the cone. The chocolate drops down the cone 5 into the container and the circulation of chocolate is continued by the action of the pump 12 until the chocolate has reached its required condition.

Having thus described the invention, what is claimed as new is:

1. An appliance of the character described comprising a container, a member in said container, means for discharging chocolate or other material in a stream under pressure into said container against said member, means for delivering a stream of air under pressure against said member to mix with said material, said member having a surface for spreading said material, and a shield near said surface to confine the stream of air close to said surface.

2. An appliance of the character described comprising a container, a member in said container, means for discharging chocolate or other material in a stream under pressure into said container against said member, means for delivering a stream of air under pressure against said member to mix with said material, said member having a surface for spreading said material, and a shield near said surface to confine the stream of air close to said surface, said surface and shield converging away from said means.

3. An appliance of the character described comprising a container, a member in said container, means for discharging chocolate or other material in a stream under pressure into said container against said member, means for delivering a stream of air under pressure against said member to mix with said material, said member having a surface for spreading said material, a shield near said surface to confine the stream of air close to said surface, and means for heating said member.

4. An appliance of the character described comprising a container, means for pumping chocolate or other material from the container and discharging it under pressure into said container, a member in the container against which said material is discharged, and means for delivering a stream of air under pressure against said member to mix with said material.

5. An appliance of the character described comprising a container, means for discharging chocolate or other material under pressure into said container, a member in the container against which said material is discharged, provisions for heating said member and means for delivering a stream of air under pressure against said member to mix with said material.

6. An appliance of the character described comprising a container, a member therein, provisions for heating said member, and means for pumping chocolate or other material from the container and discharging it under pressure against said member, said member being adapted to spread the material radially.

7. An appliance of the character described comprising a container, a cone therein, and means for pumping chocolate or other material from the container and discharging it under pressure onto said cone.

8. An appliance of the character described comprising a container, a cone therein, provisions for heating said cone, and means for discharging chocolate or other material under pressure onto said cone.

9. An appliance of the character described comprising a container, a cone therein, means for discharging chocolate or other material under pressure onto said cone, and means for delivering air under pressure against the cone including a conical shield over the cone.

10. An appliance of the character described comprising a container, a cone therein, provisions for heating said cone, means for discharging chocolate or other material under pressure onto said cone, and means for delivering air under pressure over the cone including a conical shield above the cone.

11. An appliance of the character described comprising a container, a hollow cone therein having provision for the inlet and outlet of a heating fluid, and means for discharging chocolate or other material onto said cone under pressure.

12. An appliance of the character described comprising a container, a hollow cone therein having provision for the inlet and outlet of a heating fluid, means for discharging chocolate or other material onto said cone under pressure, and means for delivering air under pressure on said cone including a conical shield above the cone.

13. An appliance of the character described comprising a container, a cone therein, means for delivering chocolate or other material under pressure downwardly against the apex of the cone including a delivery nozzle, an air blast pipe leading downwardly toward the cone, and a vertically adjustable shield above the cone having a neck telescoping over the lower end of said pipe.

14. An appliance of the character described comprising a container, a hollow cone therein having provisions for the inlet and discharge of a heated fluid, a pipe having its inlet end communicating with the container and having a delivery nozzle at its other end extending downwardly toward the apex of said cone, means for pumping chocolate or other material from the container through said pipe, air delivery means including a pipe leading downwardly toward the cone, and a conical shield above the cone having a neck telescoping over the lower end of the last named pipe and mounted for vertical adjustment.

In testimony whereof I hereunto affix my signature.

SWINFEN BRAMLEY-MOORE.